A. E. RICHEY.
HEADING TOOL.
APPLICATION FILED APR. 2, 1912.

1,103,434.

Patented July 14, 1914.

UNITED STATES PATENT OFFICE.

ALEXANDER E. RICHEY, OF JOLIET, ILLINOIS.

HEADING-TOOL.

1,103,434.     Specification of Letters Patent.     Patented July 14, 1914.

Application filed April 2, 1912. Serial No. 688,085.

*To all whom it may concern:*

Be it known that I, ALEXANDER E. RICHEY, a citizen of the United States, residing at Joliet, in the county of Will and State of Illinois, have invented a new and useful Improvement in Heading-Tools, of which the following is a specification.

My invention relates to mechanical devices for forming heads on metal bolts and the object of my invention is the formation of a square head on a bolt by one stroke or impact of a forming tool, the metal having the necessary temperature.

I attain this object by the mechanism illustrated in the accompanying drawing, in which—

Figure 3:
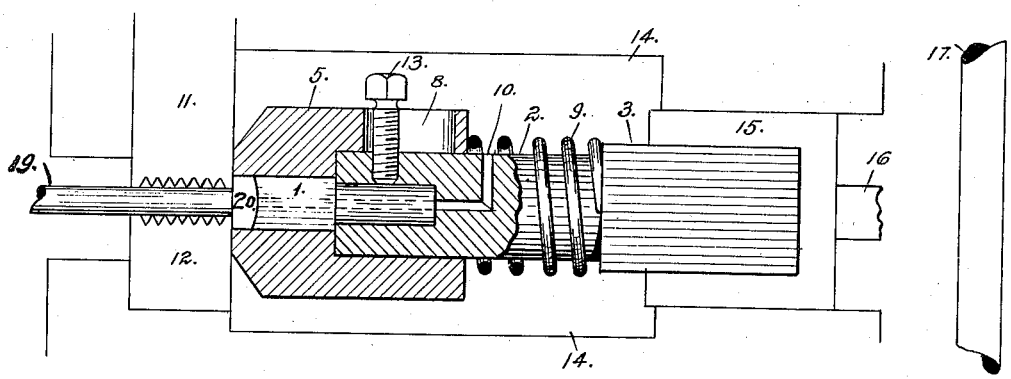
Figure 2:
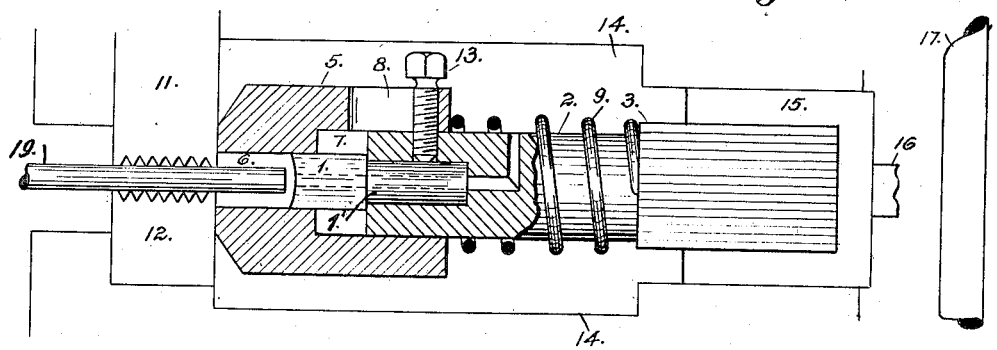
Figure 1:
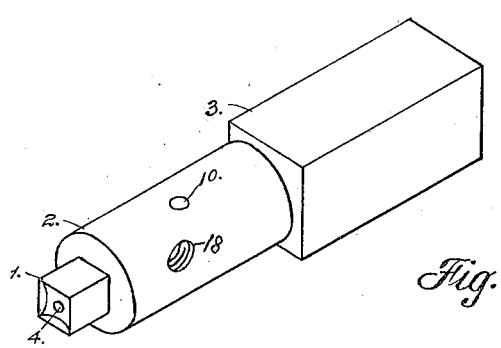

Figure 1 is a perspective view of the plunger or tool-holder. Fig. 2 is a longitudinal section of said plunger and general outline of bed of same. Fig. 3 is a like section showing the plunger moved forward and square bolt-head formed.

A part of the clamps 11 and 12 is in broken section, showing half of each clamp removed and the other halves enveloping half of the rod 19, and showing the edge surfaces of the clamps straight across the end of the die 5, and thus showing how the end of the bore 6 is closed by the edge surfaces of said clamps, excepting space occupied by cross section of the rod.

The forming tool 1 is slidable in circular bore 7 of die 5 and also in rectangular bore 6 and is integral with shank 1' fitting into part 2 which is integral with part 3 of the plunger. The vent hole 4 connects with vent hole 10. After the intensely heated end of a bolt is inserted into slot 6 and before the stroke of the plunger, the air is expanding, and the stroke of the plunger compresses the air in the slot, even before the forming tool reaches the end of the heated bolt, and the pressure is relieved by the air escaping through said vent 4—10, and thus lessens any liability to explosions or the forming of air-blisters in the bolt-head formed. The slot 8 is to allow a back and forward movement of the set-screw 13 which is to tighten or loosen said shank 1'. The spring 9 is to force the plunger back after each stroke. The clamps 11 and 12 are to firmly hold the rod 19 so that the heated end of same is projected into the recess 6 so that when the forming tool 1 is forced forward by connector 16 into the position shown in Fig. 3 the square bolt head 20 is formed. Part 3 of said plunger is clamped in cross-head 15. The hole 18 in part 2 is to receive the set-screw 13.

14 indicates a general outline for the bolt machine bed.

17 merely indicates a means for actuating the plunger, preferably, by impact.

It can be seen that a portion of part 2 of the plunger is not in section, so that the operation of spring 9 can be more clearly illustrated.

What I claim as my invention and desire to secure by Letters Patent is—

A heading tool, having a two-part bore, one part square and the other circular, and varying in dimensions so as to form a shoulder around the end of the square part; a plunger operated in the circular part of said bore with a retracting spring coiled thereon; a forming piece secured to the end of said plunger and adapted to fit snugly and operate in the square part of said bore; means for firmly closing the square end of said bore and holding a rod with its heated end held projected therein; means for actuating said plunger by impact, by means of all of which a finished square bolt-head can be formed by one stroke of said plunger, all substantially as illustrated and described.

In testimony whereof I affix my signature in the presence of two subscribing witnesses.

ALEXANDER E. RICHEY.

Witnesses:
   DELPHIE PEPIN,
   ROBERT HOHNLOCH.